United States Patent [19]

Choate

[11] Patent Number: 5,402,193
[45] Date of Patent: Mar. 28, 1995

[54] METHOD AND MEANS FOR PROJECTING IMAGES IN A CONTOUR PROJECTOR

[75] Inventor: Albert G. Choate, Rush, N.Y.

[73] Assignee: Optical Gaging Products, Inc., Rochester, N.Y.

[21] Appl. No.: 282,172

[22] Filed: Jul. 29, 1994

Related U.S. Application Data

[63] Continuation of Ser. No. 113,380, Aug. 30, 1993, abandoned.

[51] Int. Cl.⁶ .................................. G03B 21/261
[52] U.S. Cl. .......................... 353/80; 353/78; 356/391
[58] Field of Search ............... 353/65, 66, 67, DIG. 4, 353/29, 30, 37, 80, 74, 77, 78, 98, 99, 79; 356/391, 392, 393, 390, 388; 359/369

[56] References Cited

U.S. PATENT DOCUMENTS

| | | | |
|---|---|---|---|
| 3,229,572 | 1/1966 | Meltzer | 353/80 |
| 3,489,494 | 1/1970 | Snider | 353/67 |
| 4,223,986 | 9/1980 | Choate | 353/80 |

OTHER PUBLICATIONS

MP 320 Measuring Projector, Germany, 1970, pp. 285–287.

Primary Examiner—William A. Cuchlinski, Jr.
Assistant Examiner—William C. Dowling
Attorney, Agent, or Firm—Shlesinger, Fitzsimmons & Shlesinger

[57] ABSTRACT

A workpiece is mounted in a contour projector machine so that at least one of two opposed sides thereof can be observed by the operator. The side observed by the operator is illuminated by a surface illuminator, and an image thereof is projected onto the machine's projection screen also to be observed by the operator. The side of the workpiece opposite to the side observed by the operator is illuminated by a contour projector, which projects a contour image of the workpiece onto the projection screen simultaneously with the image of the illuminated surface observed by the worker, thus producing on the screen upright an unreversed images of both the contour and the observed side of the workpiece.

8 Claims, 1 Drawing Sheet

METHOD AND MEANS FOR PROJECTING IMAGES IN A CONTOUR PROJECTOR This application is a continuation of my application Ser. No. 08/113,380, filed Aug. 30, 1993, and now abandoned.

BACKGROUND OF THE INVENTION

This invention relates to contour projectors, and more particularly to an improved method and means for projecting onto the screen of the projector erect and unreversed optical images of both the contour of a workpiece, and the face of the workpiece—i.e., the same surface of the workpiece that is being observed by the operator.

In my U.S. Pat. No. 4,223,986, which is assigned to the same assignee as the present application, I disclosed a contour projector having a surface illuminator (a first light source) that was designed to project either a horizontal or vertical beam of light onto the back or rear surface of a workpiece positioned below and in front of the viewing screen of the projector. With the workpiece in this position the front face or front surface thereof, which can be observed by the operator, is positioned in the path of a second light source referred to as the contour or profile illuminator. This construction causes the contour illuminator to project through a lens system onto the projector screen the outline or contour of the workpiece, at the same time that the illuminated rear surface of the workpiece is also projected through the same lens system onto the viewing screen. As a result, while the contour illuminator in fact presents on the screen an erect and unreversed optical image of the contour of the workpiece, the image projected onto the screen by the surface illuminator is not the same image as would be perceived by an operator gazing at the front surface of the workpiece. On the contrary, the image projected by the surface illuminator is the back side of the workpiece, and hence the reverse of the surface which is being observed by the operator.

It is an object of this invention, therefore, to provide an improved method of projecting onto the screen of a contour projector machine not only an upright and unreversed contour image of a workpiece, but also an upright and unreversed image of the front surface of the workpiece, so that the operator will be observing on the screen the image of the exact surface of the workpiece which her or she observes while standing in front of the machine.

Still another object of this invention is to provide for a contour projector or the like an improved projection system which is designed to project upright and unreversed contour and surface images of a workpiece onto either upright or horizontally disposed screens.

Other objects of the invention will be apparent hereinafter from the specification and from the recital of the appended claims, particularly when read in conjunction with the accompanying drawings.

SUMMARY OF THE INVENTION

In one embodiment a workpiece is supported on the frame of a contour projector machine with the front face thereof positioned to be observed by an operator standing in front of the machine, and in spaced, confronting relation to the inclined face of a first mirror mounted in a front section of the frame forwardly of the workpiece. A contour illuminator, which is mounted in the frame rearwardly of the workpiece in horizontal registry with the face of the first mirror, projects a beam of light onto the rear surface of the workpiece, and in so doing projects a contour image of the workpiece onto the face of the first mirror. A surface illuminator, which is mounted adjacent the front of the frame beneath the first mirror, projects a beam of light upwardly through a beam splitter and a series of lenses onto the face of the first mirror, which lies in a plane inclined at approximately 45° to the beams of both illuminators, so that light from the surface illuminator is directed onto the front face of the workpiece. An image of the illuminated front face of the workpiece thus appears also in the face of the first mirror in combination with the contour image of the workpiece.

The combined images are then reflected downwardly by the first mirror onto the beamsplitter, which then reflects the combined images rearwardly of the frame to a second mirror, and from there through a series of magnification lenses onto a third mirror which projects an enlargement of the combined images onto the rear surface of the machine's projection screen. The result is that the image perceived by an operator gazing at the screen will be an upright and unreversed image of both the contour and the front face of the workpiece.

In a second embodiment the contour illuminator is positioned beneath the workpiece, and light from a surface illuminator is projected from an inclined mirror downwardly onto the upper surface of a workpiece. This permits a combined upright and unreversed image of the contour and upper face of the workpiece to be projected on a screen which may be mounted substantially horizontally on the frame.

THE DRAWING

FIG. 1 is a schematic side elevational view of a contour projector containing novel projection apparatus made according to one embodiment of this invention; and FIG. 2 is a schematic side elevational view of another form of contour projector having therein novel projection apparatus made in accordance with the second embodiment of this invention.

DETAILED DESCRIPTION OF THE PREFERRED EMBODIMENTS

Figure 1:
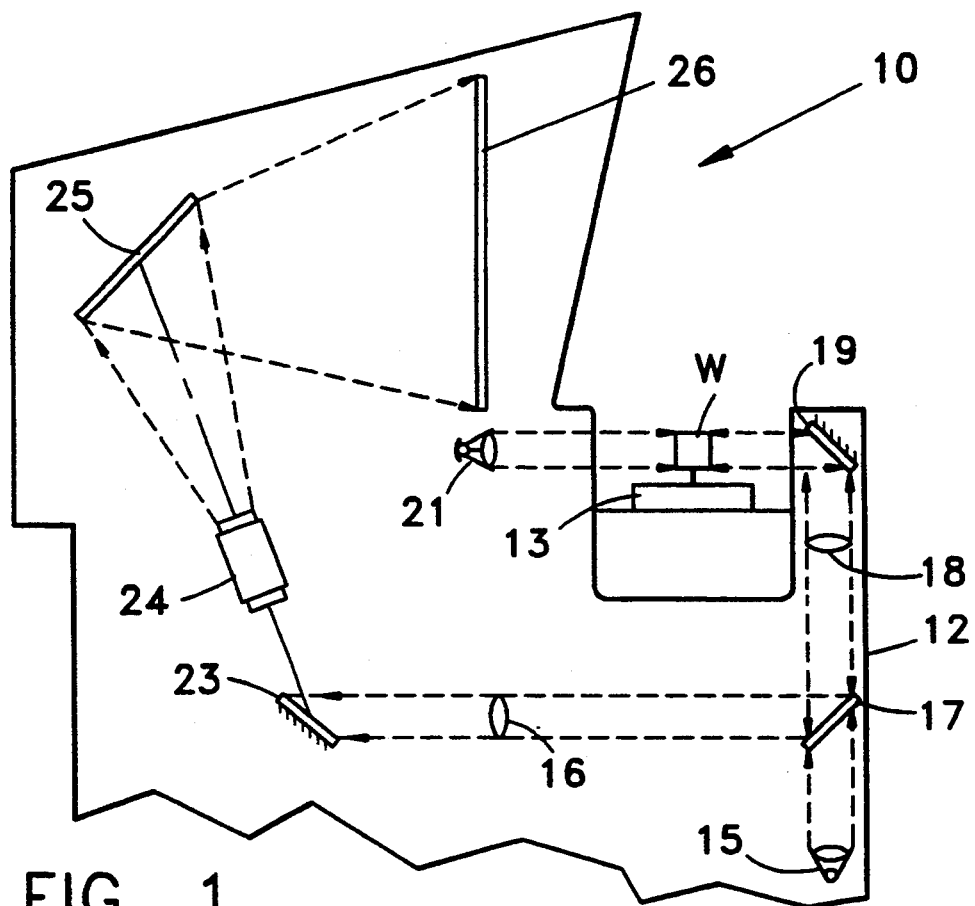

Referring now to the drawing by numerals of reference, and first to FIG. 1, 10 denotes generally a contour projector machine having mounted on the frame 12 thereof a conventional work support 13, which is designed releasably to support a workpiece W, or the lie, in an operative position on the machine. Mounted in the front section of the machine to project a beam of light vertically upwardly is a surface illuminator 15, which may be of the type disclosed in my above-noted U.S. Pat. No. 4,223,986. The beam of light from the illuminator 15 is projected in a vertical plane onto one side of a beamsplitter 17, which is mounted adjacent the front of frame 12 above the illuminator 15 to lie in a plane which is inclined at approximately 45 degrees to the plane containing the beam emitted by the illuminator 15. This beam of light passes through the beam splitter 17 and upwardly through a set of relay lenses 18 and onto the face of a reflector or mirror 19. Mirror 19 is mounted in the front section of the frame 12 adjacent the upper end thereof to lie in a plane which is inclined also at approximately 45 degrees to the vertical plane containing the beam of light transmitted from the illuminator 15, thereby to reflect such beam horizontally rearwardly in the same vertical plane, and onto the front surface of the workpiece W positioned on the support 13. The front face of the workpiece—i.e., the surface which can be observed by an operator standing in front of the machine 10, is thus illuminated by the light from illuminator 15.

A second light source in the form of a conventional contour illuminator 21 is mounted in the frame 12 horizontally rearwardly of the workpiece W, and in such a manner that it directs a horizontal beam of light also in the same vertical plane as the beam of light from illuminator 15, and onto the rear surface of the workpiece W. As a consequence, light from the illuminator 21 projects onto the surface of the mirror 19 the outline or contour image of workpiece W. At the same time, the beam of light from the illuminator 15, which illuminates the front face of the workpiece, also causes an image of the front face of workpiece W to be formed on the surface of the mirror 19. Mirror 19 in turn directs downwardly through the lenses 18 and onto the upper face of the beam splitter 17 both an image of the front surface of the workpiece, and a contour or outline of the workpiece. These combined contour and surface images of the workpiece are then reflected from the upper face of the beamsplitter 17 horizontally rearwardly in the same vertical plane as the beams from illuminators 15 and 21, and through a second relay lens system 16 and onto the face of a second mirror 23, which is mounted in frame 12 to lie in a plane inclined to the axis of the light transmitted from the face of the beam splitter 17. Mirror 23 in turn projects the combined contour and surface images also in the same vertical plane as the beams from illuminators 15 and 21, and through a series of magnification lenses 24 onto the face of a third mirror or reflector 25, which is mounted in the machine adjacent the upper, rear surface thereof. Mirror 25 registers with the rear surface of a projection screen 26 of conventional design, which is mounted in a cowling or the like adjacent the upper end of the machine frame 12 so that its front face will be viewable by an operator standing in front of the machine.

The result is that the axes of the light beams from illuminators 15 and 21, and the optical axes of the images projected from mirror 19 to the screen 26, all lie in the same vertical plane. Moreover, the image which is projected onto screen 26 will be an enlarged view of the front face of the workpiece W exactly as seen by an operator standing in front of the machine (i.e., an upright and unreversed image) as will be the image of the profile or outline of the workpiece as created by the illuminator 21. As noted above, this contrasts with the type of image heretofore projected onto the screen of conventional contour projectors of the type in which the projected image generated by the surface illuminator is the image of the rear surface of the workpiece, rather than the front surface thereof, which is the surface which normally is observed by the operator standing at the front of the machine. As a consequence, the novel projection apparatus disclosed herein permits substantially greater accuracy in inspecting and measuring workpieces.

Figure 2:
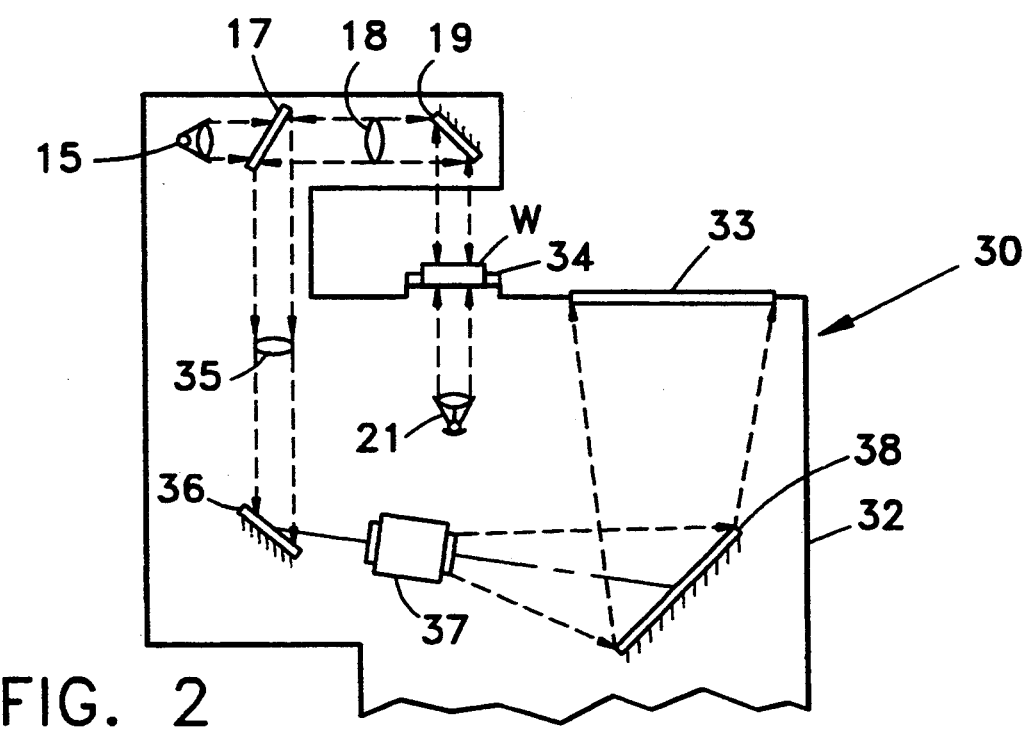

Referring now to the embodiment illustrated in FIG. 2, wherein like numerals are employed to denote elements similar to those employed in the first embodiment, 30 denotes generally a modified contour projector machine having a frame 32 which is designed to support the associated viewing screen 33 in a substantially horizontal position adjacent the front of the machine. In this embodiment the workpiece W is held by a work support 34 in registry with an opening formed in the upper surface of the frame 32 rearwardly of the screen 33. The bottom or underside of the workpiece W registers with a first light source in the form of a conventional profile illuminator 21, which in this embodiment is mounted in the frame beneath the work support 34 in order to project a beam of light vertically upwardly in a vertical plane toward the underside of the workpiece.

Mounted in frame 32 above and to the rear of the work support 34 is a conventional surface illuminator 15, which directs a beam of light horizontally in the same plane as the beam from illuminator 21, and through a beam splitter 17 that is mounted in the upper end of frame 32 to lie in a plane inclined at approximately 45 degrees to the plane containing the center line of the beam of light emitted by illuminator 15. The light from illuminator 15 passes through the beam splitter 17 and the lens system 18 onto the inclined face of a mirror 19, which is also mounted in the upper end of frame 32 to overlie the workpiece W in a plane inclined at approximately 45 degrees to the plane containing the center lines of the beams of light emitted by both illuminators 15 and 21. The light from illuminator 15 is reflected downwardly by the mirror 19 onto the upper face of the work W, and consequently an image of this surface of the workpiece W appears on the face of mirror 19 along with the profile image created by the beam emitted by the contour illuminator 21.

The combined images of the upper surface of the workpiece W and its profile are then reflected horizontally rearwardly by the mirror 19, through the lens system 18 and onto the face of the beam splitter 17 remote from the illuminator 15. The combined images are then reflected by the beam splitter 17 downwardly in the same vertical plane containing the beams from illuminators 15 and 21, and through a series of relay lenses 35 onto the inclined face of another mirror 36 which is mounted in frame 32 adjacent the rear thereof, and directly beneath lenses 35. The combined images are then reflected by mirror 36 through various magnification lenses 37 onto the surface of another inclined mirror 38, which is mounted in frame 32 adjacent the front surface thereof; and the inclined surface of mirror 38 directs the combined images upwardly onto the rear or underside of the screen 33. As a consequence, the combined contour and surface images observed by the operator standing at the front of the machine 30 will be upright and unreversed—i.e., the contour and upper surface of the workpiece W projected onto screen 33 will appear to be the same but somewhat enlarged.

From the foregoing it will be apparent that the present invention provides a relatively simple and inexpensive means for reproducing on the screen of a contour projector, or the like, upright or unreversed images of both the profile and the illuminated surface of a workpiece as it appears upon being observed by an operator, thus greatly facilitating both observation and measurement of a workpiece. Moreover, in each embodiment it will be noted that the axes of the beams of light from the emitters 15 and 21, and the projected images of the contour and workpiece face, will lie in a common vertical plane.

While in the second embodiment the screen 33 is shown to be mounted in a substantially horizontal position it will be understood that it, as well as the associated workpiece W, could be mounted in planes inclined to the horizontal without departing from this invention. Moreover, although this invention has been illustrated and described in detail herein in connection with only certain embodiments thereof, it will be apparent that it is capable of still further modification, and that this application is intended to cover any such modifications as may fall within the scope of one skilled in the art, or the appended claims.

I claim:

1. In a contour projector machine of the type having a projection screen positioned to be viewable by the operator of the machine, and a work support for removably holding a workpiece in an operative position in which one of two opposed sides of the workpiece is also positioned to be viewable by the operator, the improvement comprising first mirror means positioned to face said one side of a workpiece held in said operative position, means for directing a first beam of light along a first axis onto to said first mirror means for redirection thereby in one direction along a second axis coplanar with said first axis, and onto the surface of said one side of said workpiece, thereby to cause an image of said surface to be projected in the opposite direction along said second axis and onto said first mirror means, means for directing a second beam of light onto the other of said two opposed sides of said workpiece along an axis coaxial of and coplanar with said second axis, thereby to project a contour image of said workpiece onto said first mirror means in registry with said image of said surface, and projection means including relay lens means interposed between said first mirror means and said screen, and operative to project said registering images from said first mirror means onto said screen along optical axes coplanar with said first and second axes, and in such manner that the images on said screen are viewable by the operator in erect and unreversed positions with respect to the workpiece as viewed by the operator.

2. The contour projector machine as defined in claim 1, wherein said means for directing a second beam of light comprises a contour lamp having a light emitting surface positioned to confront directly upon said other side of said workpiece.

3. The contour projector machine as defined in claim 1, wherein said means for directing a first beam of light along a first axis comprises, a surface illuminator lamp having a light emitting surface facing in the direction of said first mirror means, and a first system of relay lenses interposed between said first mirror means and said surface illuminator lamp and operative to direct light from said lamp along said first axis onto said first mirror means.

4. The contour projector machine as defined in claim 3, wherein said projection means comprises a beamsplitter interposed between Said surface illuminator lamp and said first relay lens system, and operative to permit light from said surface illuminator lamp to pass therethrough along said first axis to said first mirror means, and operative to reflect said registering images of said surface of said contour from said mirror means along a fourth axis extending transversely of and coplanar with said first axis.

5. The contour projector machine as defined in claim 4, wherein said projection means further comprises second mirror means disposed transversely of said fourth axis, a second set of relay lenses disposed coaxially of said fourth axis between said beamsplitter and said second mirror means, and operative to project said registering images from said beamsplitter onto said second mirror means, third mirror means interposed between said screen and said second mirror means, and a third set of relay lenses interposed between said second mirror means and said third mirror means and operative to project the registering images onto said third mirror means for reflection thereby onto said screen.

6. The contour projector machine as defined in claim 1, wherein said first and second axes lie in a vertical plane.

7. A method of projecting onto the projection screen of a contour projector machine registering, upright and unreversed images of both the contour and one of two opposed sides of a workpiece, which is mounted in the machine to have said one side thereof visible to the machine operator, comprising simultaneously projecting first and second beams of light coaxially of each other onto opposite sides of said workpiece to illuminate said opposite sides, projecting registering images of the contour of said workpiece, and the illuminated surface of said one side of the workpiece, onto the face of a first mirror, which is mounted in a plane extending transversely of the axis of said beams, projecting said registering contour and surface images from said first mirror, and through a series of relay lenses, onto said projection screen, and in such manner that the images on said screen are upright and unreversed with respect to the workpiece as viewed by the operator of the machine, and during the projection of said images onto said first mirror, and onto said projection screen, maintaining the optical axes of said projected images in a common plane containing the common axis of said beams of light.

8. A method of projecting as defined in claim 7, wherein said beams of light and said images are projected in a common vertical plane.

* * * * *